(12) United States Patent
Yoshida et al.

(10) Patent No.: US 8,075,832 B2
(45) Date of Patent: Dec. 13, 2011

(54) FILM PRODUCTION METHOD

(75) Inventors: Ryuhei Yoshida, Minami-ashigara (JP); Shinji Hikita, Minami-ashigara (JP); Hiroki Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/348,124

(22) Filed: Jan. 2, 2009

(65) Prior Publication Data
US 2009/0174110 A1   Jul. 9, 2009

(30) Foreign Application Priority Data

Jan. 4, 2008   (JP) .................................. 2008-000065

(51) Int. Cl.
*B29C 71/00* (2006.01)

(52) U.S. Cl. ........ 264/532; 264/287; 425/336; 425/396; 425/369

(58) Field of Classification Search .................. 425/336, 425/396, 369; 264/532, 287
See application file for complete search history.

(56) References Cited

U.S. PATENT DOCUMENTS

| | | | | |
|---|---|---|---|---|
| 2,297,645 | A * | 9/1942 | Bailey | 264/210.5 |
| 2,974,716 | A * | 3/1961 | Fourness | 428/180 |
| 3,673,032 | A * | 6/1972 | Komoly | 156/210 |
| 4,101,625 | A * | 7/1978 | Haley | 264/287 |
| 6,129,539 | A * | 10/2000 | Bradt | 425/363 |
| 6,180,037 | B1 * | 1/2001 | Andersen et al. | 264/108 |
| 7,735,702 | B2 * | 6/2010 | Hikita et al. | 226/193 |
| 2008/0073402 | A1 * | 3/2008 | Hikita et al. | 226/196.1 |

FOREIGN PATENT DOCUMENTS

| | | |
|---|---|---|
| JP | 6-179556 A | 6/1994 |
| JP | 2005-306019 A | 11/2005 |
| WO | WO 2007116775 A1 * | 10/2007 |

OTHER PUBLICATIONS

JP 08-175727 Moore, machine translation.*
JP 08-175727 Moore, machine translation year: 2008.*

* cited by examiner

*Primary Examiner* — Joseph Del Sole
*Assistant Examiner* — David N Brown, II
(74) *Attorney, Agent, or Firm* — Sughrue Mion, PLLC (57) ABSTRACT

A solution casting apparatus includes a drive roller as a conveying means. The drive roller conveys a polymer film peeled from a belt, the polymer film still containing a solvent. The drive roller has corrugation valleys and corrugation peaks formed on a peripheral surface along a circumferential direction of the drive roller. Each of the corrugation valleys and the corrugation peaks has a substantially semicircular cross section. The corrugation valleys and the corrugation peaks are disposed alternately in an axial direction of the drive roller. A pitch $P_v$ between the corrugation valleys and a pitch $P_m$ between the corrugation peaks are in the range of 0.01 to 2 mm, and a height $H_{v-m}$ from a lowest point of the corrugation valley to a highest point of the corrugation peak is in the range of 0.01 to 1 mm. A curvature radius $R_v$ of the corrugation valley and a curvature radius $R_m$ of the corrugation peak are in the range of 0.1 to 0.5 mm.

3 Claims, 3 Drawing Sheets

FILM PRODUCTION METHOD

FIELD OF THE INVENTION

The present invention relates to a film production method for producing a polymer film by melting and extruding a polymer or by casting and drying a polymer solution.

BACKGROUND OF THE INVENTION

As a method for producing a polymer film, namely, a film production method, there are a melt extrusion method and a solution casting method. In the melt extrusion method, a polymer in the form of pellets or powders is heated to be melted. The melted polymer is extruded so as to be formed into a thin film as a polymer film. The polymer film is cooled while being conveyed. In the solution casting method, a dope obtained by dissolving a polymer into a solvent is cast onto a casting support to be a casting film. The casting film is peeled from the casting support before the solvent is completely evaporated from the casting film. The polymer film is dried while being conveyed. As described above, in both of the film production methods, the polymer film is subjected to predetermined processes while being conveyed.

As a means for conveying the polymer film, a suction roller is widely used. The suction roller has plural holes for sucking air on its peripheral surface. The holes suck air such that the polymer film is drawn so as to be in contact with the peripheral surface of the suction roller. The polymer film is conveyed in accordance with the rotation of the suction roller. The suction roller is rotated by a motor in a circumferential direction thereof.

In order to accelerate the production speed, it is necessary to enhance the sucking force of the suction roller such that a conveying speed of the polymer film is accelerated. However, the enhancement of the sucking force causes a phenomenon in which a mark of the hole of the suction roller remains on the polymer film.

For the purpose of preventing such a phenomenon, it is possible to grind the peripheral surface of the suction roller. However, in such a case, it is necessary to halt the operation of a production line, thus resulting in production loss. Therefore, the grinding is not preferable. In view of the above, there is proposed a method for coating a soft material having Rockwell hardness of 98HRR or less onto the surface of the suction roller (for example, see Japanese Patent Laid-open Publication No. 6-179556). Further, in order to prevent the phenomenon in which the mark of the hole of the suction roller remains on the polymer film and prevent scratches and wrinkles due to the polymer film slipping with respect to the suction roller, there is proposed a method in which the sucking force of the suction roller is set within a predetermined range and the difference in tension between the upstream side and the downstream side of the suction roller is set to a predetermined value in accordance with the temperature of the polymer film to be conveyed (for example, see Japanese Patent Laid-open Publication No. 2005-306019).

However, since the suction roller draws the polymer film by sucking air through the holes on its peripheral surface, foreign matters in the air or on the surface of the polymer film are adhered to the holes. The foreign matters may cause scratches on the polymer film. Accordingly, in the methods described in the Japanese Patent Laid-open Publications No. 6-179556 and No. 2005-306019, it is impossible to prevent occurrence of the scratches due to the adhesion of the foreign matters on the polymer film.

SUMMARY OF THE INVENTION

In view of the above, an object of the present invention is to provide a film production method capable of producing a polymer film having a smooth surface with no scratches and wrinkles even when foreign matters adhere to a roller while preventing slipping of the polymer film with respect to the roller used as a conveying means.

In order to achieve the above and other objects, according to a film production method of the present invention, a polymer is melted and extruded, or a polymer solution is cast and dried. The polymer film formed by the extruding or the casting is conveyed with use of a drive roller. The drive roller includes a corrugation profile in which corrugation valleys and corrugation peaks each having a substantially semicircular cross section are alternately formed on a peripheral surface along a circumferential direction of the drive roller. Each of a pitch between the corrugation valleys and a pitch between the corrugation peaks is in the range of 0.01 to 2 mm, and a height from a lowest point of the corrugation valley to a highest point of the corrugation peak is in the range of 0.01 to 1 mm.

Preferably, a curvature radius of the corrugation valley and a curvature radius of the corrugation peak are in the range of 0.1 to 0.5 mm, and a flat surface parallel to an axial direction of the drive roller is formed at each of the highest points of the corrugation peaks. The flat surface preferably has a width in the range of 0.05 to 0.5 mm in the axial direction.

The polymer film having a temperature in the range of 100° C. to 200° C. is preferably conveyed by the drive roller.

It is preferable that a difference in tension between an upstream side and a downstream side with respect to the drive roller in a conveying direction of the polymer film is in the range of 5 to 200 N/m. The value of the difference in tension is obtained per meter in a width direction of the polymer film. The polymer film is preferably conveyed by the drive roller at a conveying speed in the range of 10 to 230 m/min.

According to the film production method of the present invention, it is possible to produce a polymer film having a smooth surface with no scratches and wrinkles even when foreign matters adhere to a roller while preventing slipping of the polymer film with respect to the roller used as a conveying means.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

A film production method of the present invention includes both of a solution casting method and a melt extrusion method. Firstly, embodiments of the solution casting method are described.

[Materials]

As a raw material of a dope, a polymer and a solvent known for being used in the film production by the solution casting method can be used. Among such polymers, cellulose acylate and cyclic polyolefin are preferably used. The configuration of the film production apparatus and the film production method are basically same whichever polymer is used. Hereinbelow, cellulose acylate is used as the polymer.

As for cellulose acylate, it is preferable that the degree of hydrogen groups of cellulose esterified for carboxylic acids, that is, the degree of acylation satisfies all of the following formulae (I)-(III).

$$2.5 \leq A+B \leq 3.0 \quad (I)$$

$$0 \leq A \leq 3.0 \quad (II)$$

$$0 \leq B \leq 2.9 \quad (III)$$

In these formulae (I)-(III), "A" is the degree of substitution of acetyl groups for the hydrogen atoms on the hydroxyl groups of cellulose, and "B" is the degree of substitution of acyl groups for the hydrogen atoms on the hydroxyl groups of cellulose while each acyl group has carbon atoms whose number is from 3 to 22. Triacetyl cellulose (TAC) in which the acyl groups are the acetyl groups is especially preferable.

A glucose unit constructing cellulose with β-1,4 bond has free hydroxyl groups at $2^{nd}$, $3^{rd}$, and $6^{th}$ positions. Cellulose acylate is a polymer in which, by esterification, the hydrogen atoms on part or all of the hydroxyl groups are substituted by the acyl groups having 2 or more carbon atoms. When the esterification of one hydroxyl group in the glucose unit is made at 100% the degree of substitution is 1. As for cellulose acylate, when the esterification in each hydroxyl group at the $2^{nd}$, $3^{rd}$, and $6^{th}$ position is made at 100%, the degree of substitution is 3.

Here, the degree of acylation at the $2^{nd}$ position in the glucose unit is described as DS2, the degree of acylation at the $3^{rd}$ position in the glucose unit is described as DS3, and the degree of acylation at the $6^{th}$ position in the glucose unit is described as DS6. The sum of the degree of acylation, DS2+DS3+DS6, is preferably in the range of 2.00 to 3.00, more preferably in the range of 2.22 to 2.90, and most preferably in the range of 2.40 to 2.88. Moreover, DS6/(DS2+DS3+DS6) is preferably at least 0.28, more preferably at least 0.30, and most preferably in the range of 0.31 to 0.34.

In the present invention, cellulose acylate may be composed of either one kind of the acyl group, or two or more kinds thereof. It is preferable, when two or more kinds of the acyl groups are used, that one of them is the acetyl group. When the sum of the degree of substitution of the acetyl groups for the hydroxyl groups at the $2^{nd}$, $3^{rd}$, and $6^{th}$ positions is represented by DSA, and the sum of the degree of substitution of the acyl groups other than the acetyl groups for the hydroxyl groups at the $2^{nd}$, $3^{rd}$ and $6^{th}$ positions is represented by DSB, the value of DSA+DSB is preferably in the range of 2.22 to 2.90, and more preferably in the range of 2.40 to 2.88. DSB is preferably at least 0.30, and more preferably at least 0.70. Additionally, it is preferable that the hydroxyl groups at the $6^{th}$ position account for at least 20% of DSB, and more preferably at least 25%, and further more preferably at least 30%, and most preferably at least 33%. The value of DSA+DSB at the $6^{th}$ position of cellulose acylate is preferably at least 0.75, more preferably at least 0.80, and most preferably at least 0.85. Cellulose acylate with such a composition provides excellent solubility in the dope, and the obtained dope will become low in viscosity and excellent in filterability. Particularly, if a non-chlorine organic solvent is used together, cellulose acylate having the above-described composition is preferable.

The acyl group with 2 or more carbon atoms in cellulose acylate is not limited particularly, and may be either an aliphatic group or an aryl group. Such acyl group may be, for example, alkylcarbonyl ester of cellulose, alkenylcarbonyl ester of cellulose, aromatic carbonyl ester of cellulose, and aromatic alkylcarbonyl ester of cellulose, and each of them may have further substitutents. Exemplary substitutents are a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexane carbonyl group, an oleoyl group, a benzoyl group, a naphthyl carbonyl group, and a cinnamoyl group. Preferable among these are the propionyl group, the butanoyl group, the dodecanoyl group, the octadecanoyl group, the t-butanoyl group, the oleoyl group, the benzoyl group, the naphthyl carbonyl group, and the cinnamoyl group, and more preferable are the propionyl group and the butanoyl group.

Details regarding cellulose acylate are described in paragraphs [0140] to [0195] in Japanese Patent Laid-Open Publication No. 2005-104148. These descriptions are also applicable to the present invention.

The solvent for producing the dope may be aromatic hydrocarbon (for example, benzene, toluene, and the like), halogenated hydrocarbon (for example, dichloromethane, chloroform, chlorobenzene, and the like), alcohol (for example, methanol, ethanol, n-propanol, n-butanol, diethylene glycol, and the like), ketone (for example, acetone, methyl ethyl ketone, and the like), ester (for example, methyl acetate, ethyl acetate, propyl acetate, and the like), ether (for example, tetrahydrofuran, methyl cellosolve, and the like), and the like. Note that the dope is a polymer solution obtained by dissolving the polymer into the solvent.

As the solvent, among the above, the halogenated hydrocarbon having 1 to 7 carbon atoms is more preferable, and dichloromethane is most preferable. In view of the solubility of cellulose acylate, the peeling condition of a casting film from a support, and the properties of the film product such as mechanical strength and optical character, one or more kinds of alcohol having 1 to 5 carbon atoms is preferably mixed with dichloromethane. A preferable content of the alcohol to the entire solvent is in the range of 2 wt % to 25 wt %, and more preferably in the range of 5 wt % to 20 wt %. There are methanol, ethanol, n-propanol, isopropanol, n-butanol, and the like as preferable examples of the alcohol. Among them, methanol, ethanol, n-butanol, and a mixture thereof are preferably used.

In order to reduce adverse influence on the environment to the minimum, solvent containing no dichloromethane may be used to produce the dope. In this case, the solvent preferably contains ether with 4 to 12 carbon atoms, ketone with 3 to 12 carbon atoms, and ester with 3 to 12 carbon atoms. The solvent also contains a mixture of them. Note that ether, ketone, and ester may have a cyclic structure. A compound having at least two functional groups thereof (that is, —O—, —CO—, and —COO—) may be used as the solvent. The solvent may contain other functional groups such as alcoholic hydroxyl groups in the chemical structure.

Various known additives such as a plasticizer, a UV-absorbing agent (UV agent), a deterioration inhibitor, a lubricant, a release improver, and the like may be added to the dope in accordance with purposes. For example, known plasticizers such as phosphoric ester type plasticizers, phathalate ester type plasticizers, polyester polyurethane elastomer, and the like may be used. The phosphoric ester type plasticizers are triphenylphosphate, biphenyl diphenyl phosphate, and the like. The phathalate ester type plasticizers are diethylphthalate and the like.

Details regarding the solvent and the additives (such as a plasticizer, a deterioration inhibitor, a UV-absorbing agent, an optical anisotropy controller, dye, a matting agent, a release agent, and the like) are also described in paragraphs [0196] to in Japanese Patent Laid-Open Publication No. 2005-104148. These descriptions are also applicable to the present invention.

With use of the above-described raw materials, the dope with the cellulose acylate concentration in the range of 5 wt % to 40 wt % is produced. The concentration of cellulose acylate in the dope is more preferably in the range of 15 wt % or more and 30 wt % or less, and most preferably in the range of 17 wt % or more and 25 wt % or less. The concentration of the additives to the total solid content is preferably in the range of 1 wt % or more and 20 wt % or less.

As to the dope production, the dissolution method of the raw materials, the filtering method, the bubble removing method, and the adding method are described in detail in [0517] to [0616] in Japanese Patent Laid-Open Publication No. 2005-104148. These descriptions are also applicable to the present invention.

[Film Production Method by Solution Casting]

Figure 1:
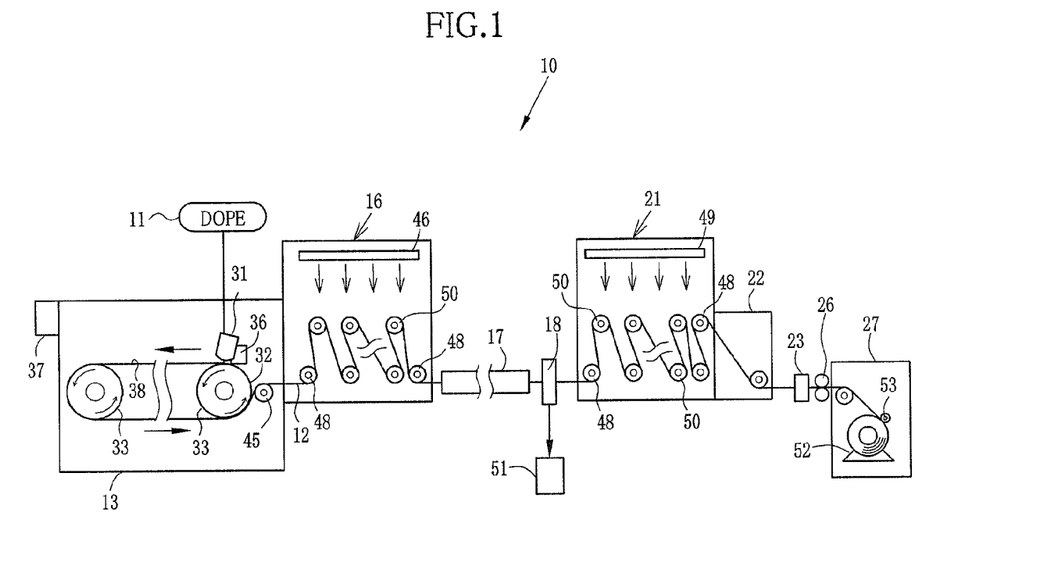
FIG. 1 is a schematic view illustrating a solution casting apparatus including drive rollers.

As shown in FIG. 1, a solution casting apparatus 10 includes a casting chamber 13, a first drying chamber 16, a tenter 17, an edge slitting device 18, a second drying chamber 21, a cooling chamber 22, a neutralization device 23, a knurling roller pair 26, and a winding section 27. In the casting chamber 13, a dope 11 in which cellulose acylate is dissolved into the solvent is cast to form a cellulose acylate film (hereinafter, referred to as film) 12. The film 12 contains the solvent. In the first drying chamber 16, the film 12 is dried while being conveyed. In the tenter 17, the film 12 fed out from the first drying chamber 16 is held at both side edges. Under such condition, the film 12 is dried while being conveyed. The edge slitting device 18 cuts off both side edges of the film 12. In the second drying chamber 21, the film 12 is dried while being conveyed until the solvent hardly remains in the film 12. In the cooling chamber 22, the film 12 is cooled. The neutralization device 23 decreases charged voltage of the film 12. The knurling roller pair 26 makes the embossing to both side edge portions of the film 12. In the winding section 27, the film 12 is wound.

In the casting chamber 13, a casting die 31 for casting the dope 11, and a belt 32 as a casting support are provided. The casting die 31 is preferably a coat hunger type. In order to maintain the temperature of the dope 11 at a predetermined value, the casting die 31 is provided with a temperature controller (not shown) for controlling the temperature of the casting die 31.

The width of the casting die 31 is not limited particularly. In this embodiment, the width of the casting die 31 is 1.1 to 2.0 times as wide as that of the film 12 as the final product. Also preferably, the casting die 31 is provided with a plurality of thickness adjustment bolts (heat bolts) at certain intervals along the width direction of the casting die 31. The heat bolts adjust slit clearance of the casting die 31 for the purpose of adjusting the thickness of the bead at the time of casting. The slit clearance of the casting die 31 and discharge amount of the dope are adjusted such that the thickness of the film 12 after being dried is in the range of 20 to 80 μm.

The belt 32 is bridged across back-up rollers 33 that rotate in the circumferential direction thereof. The belt 32 continuously moves in accordance with the rotation of the back-up rollers 33. The back-up rollers 33 are provided with a drive unit (not shown) and rotate owing to the drive unit. The width of the belt 32 is not limited particularly. In this embodiment, the width of the belt 32 is 1.1 to 2.0 times as wide as the casting width of the dope 11. The belt 32 is subjected to chrome plating or the like, and has a surface roughness of 0.01 μm or less on average.

Provided inside each of the back-up rollers 33 is a passage for a heat transfer medium (not shown). The back-up rollers 33 are connected to a heat transfer medium circulator (not shown) for controlling the temperature of the heat transfer medium and supplying the heat transfer medium to the passage. Thereby, the surface temperature of each back-up roller 33 is controlled such that the temperature of the belt 32 abutting on each back-up roller 33 becomes a predetermined value. The temperature of the belt 32 is appropriately set in accordance with types of the solvent and the solid content, the concentration of the dope 11, and the like.

A casting bead of the cast dope 11 is formed so as to extend between the casting die 31 and the belt 32. A casting film 38 is formed on the belt 32. A decompression chamber 36 is disposed in an upstream side from the casting bead in the moving direction of the belt 32. The decompression chamber 36 stabilizes the formation of the casting bead by sucking air in the upstream side from the casting bead to achieve decompression in an upstream area from the casting bead.

Preferably, the upstream area from the casting bead is decompressed such that the pressure in the upstream area is lower than that in a downstream area by 10 Pa to 2000 Pa. In addition, it is preferable to attach a suction unit (not shown) to an edge of the casting die 31 for sucking both sides of the casting bead in order to keep the shape of the casting bead desirable. An air volume sucked in the edge of the casting die 31 is preferably in the range of 1 L/min to 100 L/min.

The casting chamber 13 is provided with a temperature controller 37 for keeping the internal temperature of the casting chamber 13 at a predetermined value, and a condenser (not shown) for condensing and liquefying the solvent evaporated from the dope 11 and the casting film 38. Outside the casting chamber 13 is provided a recovery device (not shown) for recovering the condensed and liquefied solvent. The solvent recovered by the recovery device is refined and reused as the solvent for the dope production.

Inside the casting chamber 13 are provided a gas supplying section (not shown) for supplying inert gas and a ventilation duct (not shown) for exhausting gas inside the casting chamber 13 to the outside. It is preferable that the gas inside the casting chamber 13 is substituted with the inert gas such that the concentration of the solvent vapor inside the casting chamber 13 is at most 20%.

A peel roller 45 for supporting the film 12 is provided in the casting chamber 13 in order to peel the casting film 38 from the belt 32. The casting film 38 is dried until it comes to have a self-supporting property. When having the self-supporting property, the casting film 38 is peeled from the belt 32. Note that, when the casting film 38 is dried enough to be supported and conveyed in the first drying chamber 16, the casting film 38 is considered to have the self-supporting property.

When the rate of solvent content in the casting film 38 reaches 70%, the casting film 38 is able to be supported and conveyed as the film 12. However, even when the rate of solvent content in the casting film 38 is more than 70%, the casting film 38 may be supported and conveyed in some cases. In this case, the film 12 having the rate of solvent content of more than 70% may be introduced into the first drying chamber 16. The rate of solvent content in the casting film 38 gradually decreases. It is preferable that the casting film 38 is peeled from the belt 32 while the rate of solvent content is in the range of 70% or more and 150% or less. Accordingly, it is possible to prevent the casting film 38 from being partially remained on the belt 32 after being peeled from the belt 32. Additionally, it is possible to convey the film 12 more favorably in comparison with the case in which the rate of solvent content is more than 150%, while preventing a drive roller 48 from causing scratches and wrinkles on the film 12 in the first drying chamber 16.

The rate of solvent content is on a dry basis, and calculated by the following formula: $[(X-Y)/Y] \times 100$, where X is the weight of the film at the time of sampling, and Y is the weight of the same after being dried completely.

Instead of the belt 32 and the back-up rollers 33, a drum that rotates in the circumferential direction thereof may be used as the casting support. When the drum is used, the casting film 38 is cooled to turn into a gel state, and thereby the self-supporting property of the casting film 38 is developed. When the casting film 38 is dried while being cooled, the time taken before the peeing of the casting film 38 can be shortened in comparison with the case in which the belt 32 and the back-up rollers 33 are used. Thereby, the production efficiency can be further increased. Further, when the drum is used as the casting support, the casting film 38 is preferably peeled from the drum while the rate of solvent content in the casting film 38 is in the range of 100% to 300%.

The first drying chamber 16 is provided with a supply air duct 46 for blowing dry air, the drive roller 48 for conveying the film 12, and free-rotating rollers 50 for supporting the film 12. The drive roller 48 will be described in detail with reference to another drawing. The free-rotating rollers 50 are not connected to a drive source, and can be rotated in contact with the film 12. In the first drying chamber 16, the film 12 is dried enough to be held in the tenter 17 as described later. When the rate of solvent content in the film 12 is at most 30%, the film 12 is considered to be dried enough to be held, in general. As shown in FIG. 1, the casting chamber 13 and the first drying chamber 16 are provided in this order so as to be next to each other in the conveying direction of the film 12. It is preferable that, immediately after the casting film 38 is peeled from the belt 32 to be the film 12, the film 12 is introduced into the first drying chamber 16 to be dried therein. In this case, the rate of solvent content in the film 12 at the time of peeling can be considered as the same as that at the time of being introduced to the first drying chamber 16.

It is preferable that the film 12 is dried until the rate of solvent content becomes 10% to 30% in the first drying chamber 16. As described above, the casting film 38 is preferably peeled from the belt 32 while the rate of solvent content is in the range of 70% to 150%. Therefore, the film 12 is preferably dried in the first drying chamber 16 while the rate of solvent content is in the range of 70% to 30%. When the casting film 38 is peeled as the film 12 from the belt 32, the rate of solvent content is in the range of more than 70% and 150% or less. Value A is any value in this range. While the film 12 is dried in the first drying chamber 16, the rate of solvent content is in the range of 10% or more and less than 30%. Value B is any value in this range. Therefore, until Value A reaches Value B, the film 12 is dried in the first drying chamber 16. In a case where an additive is contained in the film 12, the additive is evaporated together with the solvent in the first drying chamber 16 in which the rate of solvent content in the film 12 varies significantly as described above, and then the evaporated additive is adhered to the drive roller 48 to be solidified in many cases. However, it is possible to convey the film 12 favorably by the drive roller 48 while preventing slipping of the film 12 and further occurrence of scratches and wrinkles due to adhesion of foreign matters such as additives onto the polymer film. In addition, foreign matters such as additives adhered to the surface of the drive roller 48 and solidified will not be pressed against the film 12, and therefore a surface of the film 12 will not be distorted.

Note that the film 12 may be further dried in the first drying chamber 16 even if the rate of solvent content is decreased to 20%. Preferably, the film 12 is dried in the first drying chamber 16 until the rate of solvent content becomes within the range of 10 to 30%. Even if the rate of solvent content in the film 12 is less than 30%, when the drive roller 48 is used to convey the film 12, the effect for preventing occurrence of scratches and wrinkles is increased more.

The air from the supply air duct 46 may be directly blown to the film 12. Alternatively, the air from the supply air duct 46 may be circulated inside the first drying chamber 16 such that the concentration of the solvent vapor around the film 12 is not saturated.

The temperature of the film 12 is adjusted mainly by the air from the supply air duct 46. The temperature of the film 12 in the first drying chamber 16 is preferably in the range of 10° C. or more and less than 100° C. The temperature of less than 10° C. causes decrease in drying efficiency, and it becomes necessary to make the length of a conveying path in the first drying chamber 16 longer in comparison with a case in which the temperature is 10° C. or more. On the contrary, the temperature of 100° C. or more causes deformation of the film 12 due to the rapid evaporation of the solvent.

Since the film 12 contains the solvent, upon change in the temperature, the frictional force between the film 12 and other component also easily changes. However, when the drive roller 48 is used, even if the temperature of the film 12 varies widely in the range of 10° C. or more and less than 100° C., it is possible to convey the film 12 favorably without the slipping of the film 12, and further no scratches and wrinkles occur on the film 12 even if the foreign matters adhere to the drive roller 48. Accordingly, even if the temperature of the film 12 changes from the upstream side to the downstream side of a conveying path in the first drying chamber 16, it is possible to convey the film 12 favorably.

Provided inside the first drying chamber 16 is a gas supplying section (not shown) for supplying inert gas. It is preferable that the gas inside the first drying chamber 16 is substituted with the inert gas such that the concentration of the solvent vapor inside the first drying chamber 16 is at most 20%.

In the first drying chamber 16, draw tension that is a tension in the film conveying direction is preferably applied to the film 12. Owing to this, the film 12 is prevented from sagging. When the rotating speed of the drive roller 48 provided in the conveying path in the first drying chamber 16 is adjusted, the draw tension applied to the film 12 moving in the upstream side from the drive roller 48 can be adjusted. When the drive roller 48 is used, it is possible to convey the film 12 favorably without causing scratches and wrinkles, in addition to preventing sagging and slipping of the film 12 with respect to the drive roller 48. Preferably, the draw tension applied to the film 12 is in the range of 10 N/m to 300 N/m. Under such draw tension, the drive roller 48 is highly effective in prevention of slipping of the film 12 and improvement in smoothness of the film 12, in comparison with a conventional means such as a suction roller. The value of the draw tension is obtained per meter in the width direction of the film 12. Accordingly, the range of the draw tension particularly effective in use of the diver roller 48 is in the range of $n \times 10$ (N) to $n \times 300$ (N)

wherein n is a width of the film 12 (0<n, unit;m). Note that plural drive rollers 48 may be provided in the first drying chamber 16.

In the tenter 17, both side edges of the film 12 are held with holding members (not shown), and then the film 12 is conveyed in accordance with the movement of the holding members. The film 12 is dried while being conveyed. Clips that hold the side edges of the film 12, pins that are penetrated through the side edges of the film 12 to hold it, and the like are used as the holding members. When the belt 32 is used as the casting support and the casting film 38 is peeled after evaporation of part of the solvent from the casting film 38, the clips are preferably used as the holding members in the tenter 17. On the other hand, when the drum is used as the casting support and the casting film 38 after being cooled is peeled before the solvent hardly evaporate therefrom, the pins are preferably used as the holding members in the tenter 17. In the tenter 17, the temperate of the film 12 is regulated to be in the range of 120° C. to 180° C., thereby the drying of the film 12 is proceeded.

After being dried in the tenter 17, both side edges of the film 12 are cut off by the edge slitting device 18. The side edges thus cut off are sent to a crusher 51 by a cutter blower (not shown) and crushed into chips by the crusher 51. The chips are recycled for preparing the dope.

The film 12 whose side edges have been cut off is sent to the second drying chamber 21. In the second drying chamber 21, the film 12 is further dried while being conveyed. A conveying path in the second drying chamber 21 is also provided with the drive rollers 48 as the conveying means for the film 12 and the free-rotating rollers 50 for supporting the film 12 as in the case of the first drying chamber 16. Even though the temperature of the film 12 is as high as, for example, 100° C. or more, the drive rollers 48 as the conveying means can stably convey the film 12 without slipping of the film 12. Therefore, occurrence of scratches and wrinkles on the film 12 can be prevented. In addition, foreign matters will not be pressed against the film 12 by the guide rollers 48, and therefore the surface of the film 12 will not be distorted by the drive rollers 48.

Note that among the plural rollers provided in the conveying path in the second drying chamber 21, the drive roller 48 is preferably used as the uppermost stream side roller and the lowermost stream side roller. Between these two drive rollers 48, the free-rotating rollers 50 may be provided. However, the arrangement of the drive rollers 48 and the free-rotating rollers 50 is not limited thereto.

The air from the supply air duct 49 may be directly blown to the film 12. Alternatively, the air from the supply air duct 49 may be circulated inside the second drying chamber 21 such that the concentration of the solvent vapor around the film 12 is not saturated.

The temperature of the film 12 is adjusted mainly by the air from the supply air duct 49. The temperature of the film 12 in the second drying chamber 21 is preferably in the range of 100° C. to 200° C., more preferably in the range of 100° C. to 180° C., and most preferably in the range of 100° C. to 160° C. Thereby, it is possible to dry the film 12 such that the rate of solvent content in the film 12 is equal to or less than 0.1% in the second drying chamber 21. In a case where the temperature of the film 12 is 100° C. or more, it is conventional that the suction roller or the like causes scratches and wrinkles on the film 12. However, according to the present invention, it is possible to convey the film 12 favorably without causing scratches and wrinkles on the film 12. In a case where the temperature of the film 12 is less than 100° C., there arises decrease in drying efficiency, and therefore it becomes necessary to make the length of the conveying path in the second drying chamber 21 longer in comparison with a case in which the temperature of the film 12 is 100° C. or more. On the contrary, when the temperature of the film 12 is more than 200° C., the film 12 is soften and stretched, and therefore the film 12 cannot be conveyed.

In the second drying chamber 21, in order to dry the film 12 more effectively and efficiently within a range where the film 12 is not deteriorated, the temperature of the film 12 is made high as described above. The temperature of film 12 containing the solvent is highly dependent on frictional force between the film 12 and other component. As the temperature of the film 12 is higher, the frictional force is increased more. Additionally, as the temperature of the film 12 is made higher, the additive contained in the film 12 is more easily evaporated and adhered to the drive roller 48. However, when the drive roller 48 to be described later is used as the conveying means, even if the temperature of the film 12 containing the solvent is as high as, for example, 100° C. or more, and even if the additive is adhered to the drive roller 48 and solidified, the film 12 can be conveyed favorably without slipping with respect to the drive roller 48. Further, it is possible to prevent scratches and wrinkles on the film 12 and prevent distortion of the surface of the film 12 due to the solidified additive. The effect described above is especially high in a case where TAC is used as the polymer of the film 12, and the temperature of the film 12 is approximately in the range of 140° C. to 200° C. Accordingly, during the conveyance of the film 12 in the second drying chamber 21, no scratches and wrinkles occur on the film 12.

The draw tension is preferably applied to the film 12 conveyed in the second drying chamber 21. Owing to this, the film 12 is prevented from sagging or being deformed. In a case where the plural drive rollers 48 are provided along the conveying path in the first drying chamber 16, when the rotating speed of each of the drive rollers 48 is adjusted, it is possible to adjust the draw tension applied to the film 12 moving in the upstream side from each of the drive rollers 48. In a case where the drive roller 48 is used, in addition to prevent sagging of the film 12, no scratches and wrinkles occur on the film 12 even if foreign matters or the like adhere to the drive roller 48, and thereby it is possible to convey the film 12 favorably without slipping of the film 12 with respect to the drive roller 48.

In the second drying chamber 21, in a case where the difference in draw tension between the upstream side and the downstream side of the conveying means is within the range of 5 N/m to 200 N/m, the effect of using the drive roller 48 as the conveying means is particularly high. The value of difference in draw tension is also obtained per meter in the width direction of the film 12. Accordingly, when n is a width of the film 12 (0<n, unit; m), n may be multiplied with the above value.

The preferable example of the draw tension in the second drying chamber 21 is explained hereinbelow. For example, in a case where the drive rollers 48 are only the uppermost stream side roller and the lowermost stream side roller among the plural rollers provided in the conveying path in the second drying chamber 21, it is preferable that a rotating speed of the lowermost stream side roller is faster than that of the uppermost stream side roller. Thereby, the draw tension applied between the uppermost stream side drive roller 48 and the lowermost stream side drive roller 48 (hereinafter referred to as downstream side draw tension) can be made higher than the draw tension applied to the upstream side from the uppermost stream side roller 48 (hereinafter referred to as upstream side draw tension). The rotating speed of each of the drive rollers 48 is adjusted such that the difference in draw tension between the downstream side draw tension and the upstream side draw tension is within the range of 5 N/m or more and 200 N/m or less. Note that the adjustment of the draw tension may be performed by changing not only the rotating speed of each of the drive rollers 48 but also the position of the free-rotating roller 50, and further by using a well-known dancer roller or the like.

The dried film 12 is preferably cooled to approximately room temperature in the cooling chamber 22.

The neutralization device 23 is a so-called compulsory neutralization device such as a neutralization bar, and regulates the charged voltage of the film 12 within a predetermined range. The neutralization device 23 preferably performs neutralization such that the charged voltage of the film 12 is within the range of −3 kV to +3 kV. The position of the neutralization device 23 is not limited to the downstream side from the cooling chamber 22.

The knurling roller pair 26 provides the film 12 with knurling by making the embossing to both side edge portions of the film 12. When the knurling is provided to the film 12, the height of each of projections and depressions of the knurling is preferably within the range of 1 µm to 200 µm.

Inside the winding section 27 are provided a winding device 52 for winding the film 12 and a press roller 53 for controlling the tension of the film 12 at the time of winding.

Figure 2:
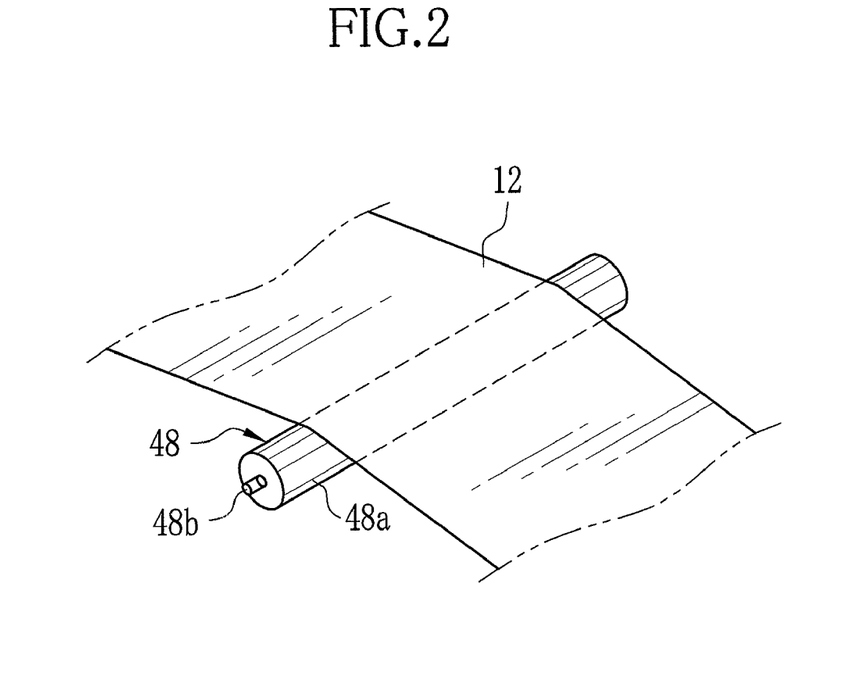
FIG. 2 is a perspective view illustrating a structure of the drive roller.

As shown in FIG. 2, each of the drive rollers 48 is constituted from a roller body 48a and shafts 48b. The shaft 48b is fixedly inserted into opposite ends of the roller body 48a, respectively. Each of the drive rollers 48 rotates in a circumferential direction by a motor (not shown). The roller body 48a conveys the film 12 while supporting the film 12 with a peripheral surface thereof. Materials for the roller body 48a and the shafts 48b are, for example, aluminum, iron, stainless steal, carbon fiber reinforced plastic (CFRP), and the like having excellent corrosion resistance.

Figure 3:
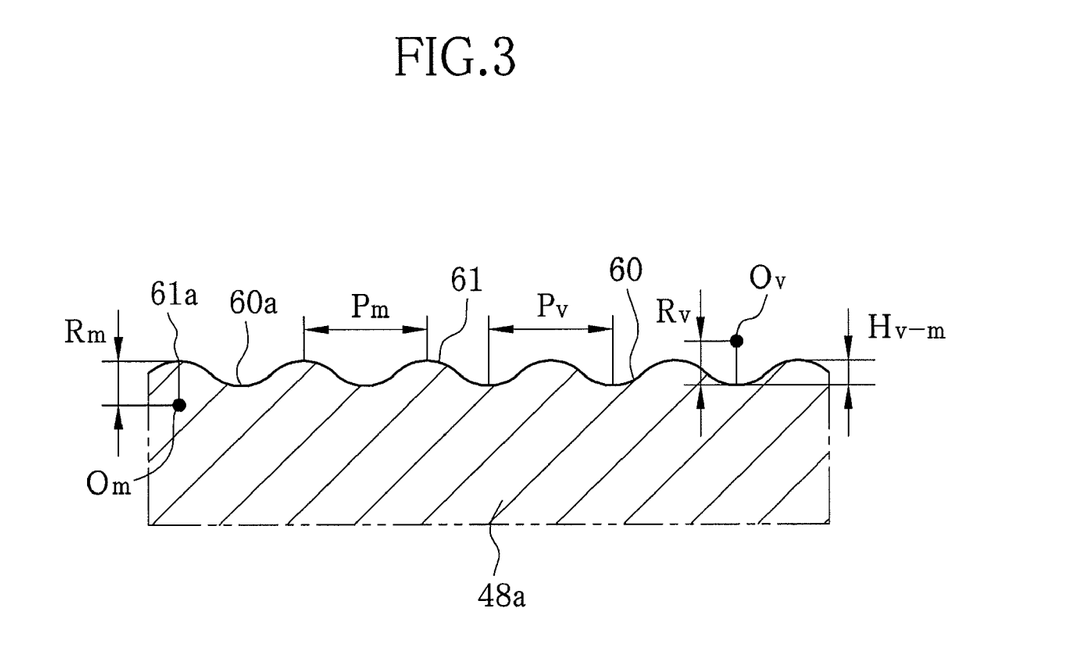
FIG. 3 is an enlarged partial section view illustrating a surface shape of the drive roller.

As shown in FIG. 3, a corrugation profile having corrugation valleys 60 and corrugation peaks 61 with a constant pitch is formed on the peripheral surface along a circumferential direction of the roller body 48a. The corrugation valleys 60 and the corrugation peaks 61 each have a substantially semicircular cross section. The corrugation valleys 60 and the corrugation peaks 61 are disposed alternately in an axial direction of the roller body 48a. The corrugation valleys 60 and the corrugation peaks 61 are accurately processed and formed by a precision lathe with use of a cutting tool.

A pitch $P_v$ of the corrugation valleys 60, which is the distance between lowest points 60a of the adjacent two corrugation valleys 60, and a pitch $P_m$ of the corrugation peaks 61, which is the distance between highest points 61a of the adjacent two corrugation peaks 61 are in the range of 0.01 mm or more and 2 mm or less. When the pitches $P_v$ and $P_m$ are less than 0.01 mm, the lathing processing becomes difficult, and the production cost becomes extremely high even if the lathing can be performed. When the pitches $P_v$ and $P_m$ are more than 2 mm, on the other hand, the film 12 may slip with respect to the guide roller 48. Further, a mark due to the roller pressed against the film 12 or due to the foreign matters such as solidified additives, and scratches may remain on the surface of the film 12.

A height $H_{v-m}$ from the lowest point 60a to the highest point 61a is in the range of 0.01 to 1 mm. When the height $H_{v-m}$ is less than 0.01 mm, the air between the film 12 and the drive roller 48 cannot be released. Thereby, the film 12 tends to slip with respect to the drive roller 48, and scratches and wrinkles occur on the film 12, or a mark due to the roller pressed against the film 12 or the foreign matters may remain on the surface of the film 12 in some cases. When the height $H_{v-m}$ is more than 1 mm, on the other hand, the lathing processing becomes difficult, and the production cost becomes extremely high even if the lathing can be performed.

A curvature radius $R_v$ of the corrugation valley 60, which is the distance from a center point $O_v$ of a circle forming a cross section of the corrugation valley 60 to the lowest point 60a, and a curvature radius $R_m$ of the corrugation peak 61, which is the distance from a center point $O_m$ of a circle forming a cross section of the corrugation peak 61 to the highest point 61a are in the range of 0.1 mm or more and 0.5 mm or less. When the curvature radii $R_v$ and $R_m$ are less than 0.1 mm, a contact area of the drive rollers 48 to the film 12 becomes so small that the film 12 may slip with respect to the drive roller 48. Further, marks and scratches due to foreign matters may occur on the film 12 in some cases. When the curvature radii $R_v$ and $R_m$ are more than 0.5 mm, on the other hand, the height $H_{v-m}$ becomes so small that the film 12 may slip with respect to the drive roller 48. Further, marks and scratches due to foreign matters and marks due to the drive roller 48 pressed against the film 12 may remain on the film 12 in some cases.

Figure 4:
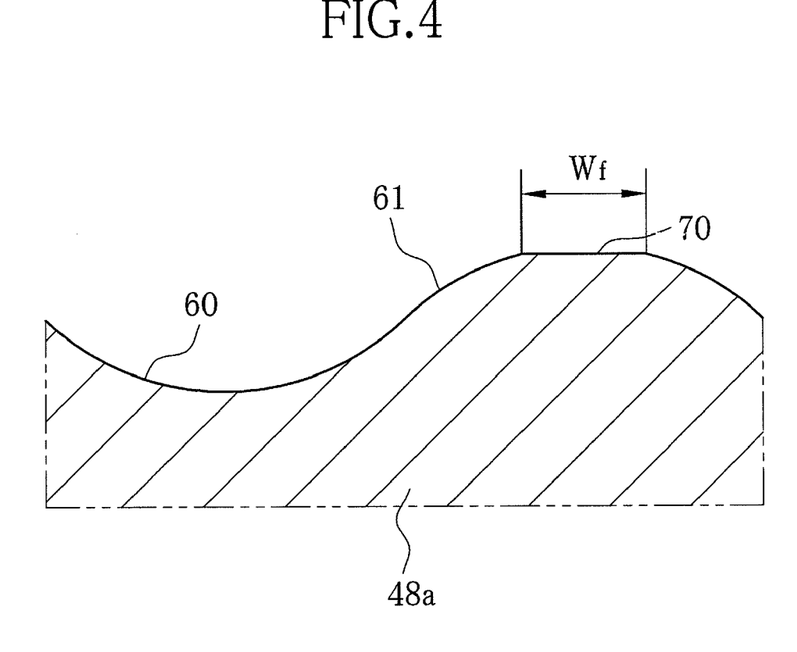
FIG. 4 is a further enlarged partial section view illustrating the surface shape of the drive roller.

As shown in FIG. 4, a flat surface 70 is formed at the highest point 61a of the corrugation peak 61. The flat surface 70 that is parallel to the axial direction of the roller body 48a is processed and formed by, for example, grinding the highest point 61a of the corrugation peak 61 with use of a grinder, after the formation of the corrugation valleys 60 and the corrugation peaks 61. A width $W_f$ of the flat surface 70 in the axial direction is in the range of 0.05 mm or more and 0.5 mm or less. When the width $W_f$ is less than 0.05 mm, some highest portions 61a cannot be grinded depending on the processing accuracy of the corrugation peaks 61. When the width $W_f$ is more than 0.5 mm, on the other hand, the corrugation valleys 60 and the corrugation peaks 61 cannot be formed at the above-described pitches.

As explained above, the drive roller 48 is characterized by the following features. The corrugation valleys 60 and the corrugation peaks 61 each having a substantially semicircular cross section are formed alternately on the peripheral surface along the circumferential direction of each drive roller 48. The pitch $P_v$ of the corrugation valleys 60 and the pitch $P_m$ of the corrugation peaks 61 are in the range of 0.01 to 2 mm. The height $H_{v-m}$ from the lowest point 60a of the corrugation valley 60 to the highest point 61a of the corrugation peak 61 is in the range of 0.01 to 1 mm. Accordingly, when the film 12 is conveyed by the drive rollers 48 having the above features, the air between the film 12 and the drive rollers 48 can be efficiently released even if the solidified additives and other foreign matters adhere to the drive roller 48. Owing to this, the drive rollers 48 contact the film 12 with such a frictional force that the film 12 does not slip with respect to the drive rollers 48. Accordingly, the occurrence of scratches and wrinkles on the film 12 can be prevented. In addition, marks due to the drive roller 48 pressed against the film 12 and the foreign matters do not remain on the film 12.

The flat surface 70 is formed at each highest point 61a of the corrugation peaks 61. The width $W_f$ of the flat surface 70 in the axial direction is in the range of 0.05 to 0.5 mm. Accordingly, the frictional force can be further enhanced, and streak pattern due to the flat surface 70 does not remain on the film 12.

Note that the pitches $P_v$ and $P_m$ are more preferably in the range of 0.3 to 0.5 mm. In addition, the height $H_{v-m}$ is more preferably in the range of 0.02 to 0.1 mm.

The curvature radii $R_v$ and $R_m$ are more preferably in the range of 0.2 to 0.4 mm. The width $W_f$ is more preferably in the range of 0.1 to 0.3 mm.

When the conveying speed of the film 12 is in the range of 10 m/min to 230 m/min, the effect of using the drive roller 48 is particularly high, and when the conveying speed of the film 12 is in the range of 40 m/min to 230 m/min, the effect of using the drive roller 48 is further increased.

The width of the film 12 is more preferably in the range of 1800 to 2500 mm. Generally, as the width of the film 12 increases, more likely scratches and wrinkles due to the slipping occur on the film 12. However, the effect of using the drive roller 48 is exerted enough even if the width of the film 12 is in the range of 1800 to 2500 mm.

According to the above-described more preferable ranges of the pitches $P_v$ and $P_m$, the height $H_{v-m}$, the curvature radii $R_v$ and $R_m$, width $W_f$, and the width of the wet film, the above-described effect is especially high.

Note that if the free-rotating roller, which is provided along the conveying path of the film in the film production apparatus, and to which a drive source is not connected, has the same shape as that of the drive roller 48, the effect as preferable as the above can be obtained.

According to the melt extrusion method, the drive roller 48 is provided in the downstream side from a well-known melt-extrusion device (not shown). The melt-extrusion device includes a heating section for heating and melting the supplied polymer, and an extruding section for extruding the melted polymer in the form of a film to the outside. The heating section includes a kneading member for mixing or kneading the polymer. A commercially available melt extruding device may be used as the melt extruding device of the present invention. The temperature of the polymer film immediately after being extruded from the melt extrusion device is as high as the melting point thereof, and therefore the polymer film cannot be subjected to a next process immediately after the extrusion in many cases. The next process is, for example, a stretching process for applying tension to the polymer film in the width direction thereof to stretch the same, a winding process, and the like. Preferably, the polymer film is cooled while being conveyed. The cooling is performed not only by so-called forced cooling such as blowing air and contacting with cool water but also so-called natural cooling in which only conveyance of the film is performed until the temperature drops on its own. Both of them are applicable to the present invention.

In the conveyance until the next process or in the conveyance during the next process, the drive roller 48 is preferably used. Thereby, it is possible to convey the polymer film having the temperature of approximately melting point thereof as well as the polymer film after the cooling without causing scratches and wrinkles on the polymer film. Accordingly, the obtained polymer film has excellent smoothness. Further, in the melt extrusion method, as described above, the temperature of the polymer film widely changes from high temperature such as the melting point immediately after the extrusion thereof to low temperature such as an approximately room temperature as a final product. According to the present invention, regardless of the change in temperature, the polymer film can be conveyed favorably, and no scratches and wrinkles occur on the polymer film.

As described above, according to the present invention, regardless of existence of solvent in the film, even when the film having high temperature due to the heating is conveyed, no scratches and wrinkles due to the roller as the conveying means occur on the film, and therefore a film having excellent smoothness can be obtained.

EXAMPLE 1

The roller body 48a of each drive roller 48 was made of stainless steel (without plating) and had a diameter of 300 mm and a length of 1000 mm in a longitudinal direction. The shaft 48b was fixedly fitted respectively to a center of the opposite ends of the roller body 48a so as to define the rotation center of the roller body 48a. A bearing was attached to each of the shafts 48b so as be symmetrical to each other with respect to the roller body 48a. The distance between a core of one bearing and a core of the other bearing was 1500 mm. The corrugation valleys 60 and the corrugation peaks 61 were formed on the roller body 48a such that the pitches $P_v$ and $P_m$ were 0.5 mm, the height $H_{v-m}$ was 0.04 mm, and the curvature radii $R_v$ and $R_m$ were 0.4 mm.

A dope 11 having the following composition was prepared.

| | |
|---|---|
| Triacetyl cellulose (acetylation degree: 60.7%) | 100 pts. wt |
| Plasticizer A (triphenylphosphate (TPP)) | 8 pts. wt |
| Plasticizer B (biphenyl diphenyl phosphate (BDP)) | 4 pts. wt |
| Matting agent | 0.03 pts. wt |
| Solvent component 1 (dichloromethane) | 594 pts. wt |
| Solvent component 2 (methanol) | 66 pts. wt |

The film 12 was produced from the dope 11 by the solution casting apparatus 10 shown in FIG. 1. The temperature of the film 12 set for the second drying chamber 21 varied in Experiments 1 to 6. Among the plural rollers provided in the second drying chamber 21, each of the uppermost stream side roller and the lowermost stream side roller was the drive roller 48. In the conveying path between these two drive rollers 48 were provided plural free-rotating rollers 50.

The draw tension between the lowermost stream side drive roller 48 and the uppermost stream side drive roller 48 (downstream side draw tension) was higher by 10 N/m than the draw tension in the upstream side from the uppermost stream side drive roller 48 (upstream side draw tension). The difference in draw tension between the downstream side draw tension and the upstream side draw tension is shown at a section of "TENSION DIFFERENCE" in Table 1. The conveying speed of the film 12 was set to 70 m/min as shown at a section of "CONVEYING SPEED" in Table 1. Note that all of the drive rollers provided in the conveying path in components of the solution casting apparatus 10 other than the second drying chamber 21 were the drive rollers 48. The films 12 obtained from Experiments 1 to 6 were evaluated as to whether there were scratches, wrinkles, or roller marks. The roller marks mean the marks remained on the film due to the roller pressed against onto the film. The evaluation was made by visually checking the films 12. When there were no scratches, wrinkles, or roller marks recognized, the film was evaluated as "A". When there were slight scratches, wrinkles, or roller marks recognized, the film was evaluated as "B". When there were scratches, wrinkles, or roller marks recognized, the film was evaluated as "C". When there were deep scratches, wrinkles, or roller marks often or continuously recognized, the film was evaluated as "D". The evaluation results are shown at a section of "EVALUATION" in Table 1.

Figure 5:
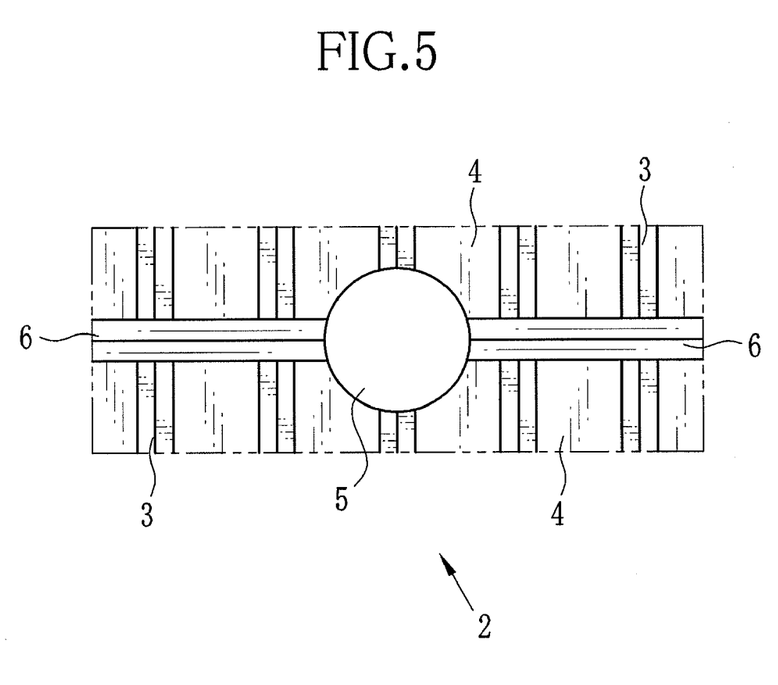
FIG. 5 is an explanatory view illustrating a shape of a suction roller as Comparative Example.

A suction roller 2 having the following features was prepared. A roller body of the suction roller was made of stainless steel (without plating) and had a diameter of 300 mm and a length of 1000 mm in a longitudinal direction. Shaft was fixedly fitted respectively to a center of the opposite ends of the roller body so as to define the rotation center of the roller body. A bearing was attached to each of the shafts so as be symmetrical to each other with respect to the roller body. The distance between a core of one bearing and a core of the other bearing was 1500 mm. As shown in FIG. 5, substantially V-form grooves 3 were formed along a circumferential direction of the roller body of the suction roller 2 with a pitch of 2 mm, a height of 0.5 mm, and a width of 1 mm. These grooves 3 were referred to as vertical grooves. The roller body had flat surfaces 4 with a width of 1 mm and a curvature radius of 0.2 mm at the boundary to the vertical grooves 3. Plural suction holes 5 each having a diameter of 3 mm were also formed on the roller body. Substantially V-form grooves 6 were formed along an axial direction of the roller body such that the grooves 6 extend from the center of each of the suction holes 5. These grooves 6 were referred to as horizontal grooves. The horizontal grooves 6 had a width of 1 mm and a height of 0.5 mm.

Comparative Experiments 1 to 6 were performed using the suction rollers 2 in the second drying chamber 21 instead of using the drive rollers 48 in Experiments 1 to 6. Note that all the drive rollers disposed in the conveying path in components of the solution casting apparatus 10 other than the second drying chamber 21 were the drive rollers 48. Other conditions and the evaluating method were same as those of Experiments 1 to 6.

TABLE 1

|  | TEMPER-ATURE (° C.) | TENSION DIFFERENCE (N/m) | CONVEYING SPEED (m/min) | EVALUATION RESULT |
| --- | --- | --- | --- | --- |
| EX. 1 | 25 | 10 | 70 | A |
| COM. 1 |  |  |  | C |
| EX. 2 | 30 |  |  | A |
| COM. 2 |  |  |  | B |
| EX. 3 | 50 |  |  | A |
| COM. 3 |  |  |  | B |
| EX. 4 | 100 |  |  | A |
| COM. 4 |  |  |  | D |
| EX. 5 | 150 |  |  | A |
| COM. 5 |  |  |  | D |
| EX. 6 | 200 |  |  | A |
| COM. 6 |  |  |  | D |

EX.: Experiment
COM.: Comparative Experiment

EXAMPLE 2

Experiments 1 to 5 were performed under the same conditions as Example 1 except that the temperature of the film 12 in the second drying chamber 21 was regulated to 100° C., and the tension difference between the downstream side draw tension and the upstream side draw tension was changed in each of Experiment 1 to 5 as shown in Table 2. The evaluating method was the same as that of Example 1. The results are shown in Table 2.

Comparative Experiments 1 to 5 were performed using the suction rollers 2 in the second drying chamber 21 instead of using the drive rollers 48 in Experiments 1 to 5. Other conditions were same as those of Experiments 1 to 5. The results are shown in Table 2.

TABLE 2

|  | TEMPER-ATURE (° C.) | TENSION DIFFERENCE (N/m) | CONVEYING SPEED (m/min) | EVALUATION RESULT |
| --- | --- | --- | --- | --- |
| EX. 1 | 100 | 0 | 70 | A |
| COM. 1 |  |  |  | A |
| EX. 2 |  | 5 |  | A |
| COM. 2 |  |  |  | B |
| EX. 3 |  | 10 |  | A |
| COM. 3 |  |  |  | C |
| EX. 4 |  | 20 |  | A |
| COM. 4 |  |  |  | C |
| EX. 5 |  | 200 |  | A |
| COM. 5 |  |  |  | C |

EXAMPLE 3

Experiments 1 to 4 were performed under the same conditions as those of Example 1 except that the temperature of the film 12 in the second drying chamber 21 was regulated to 100° C., and the conveying speed of the film 12 was changed in each of Experiment 1 to 4 as shown in Table 3. The evaluating method was the same as that of Example 1. The results are shown in Table 3.

Comparative Experiments 1 to 4 were performed using the suction rollers 2 in the second drying chamber 21 instead of the drive rollers 48 in Examples 1 to 4. Other conditions were the same as those of Experiments 1 to 4. The results are shown in Table 3.

TABLE 3

|  | TEMPER-ATURE (° C.) | TENSION DIFFERENCE (N/m) | CONVEYING SPEED (m/min) | EVALUATION RESULT |
| --- | --- | --- | --- | --- |
| EX. 1 | 100 | 10 | 40 | A |
| COM. 1 |  |  |  | C |
| EX. 2 |  |  | 70 | A |
| COM. 2 |  |  |  | C |
| EX. 3 |  |  | 100 | A |
| COM. 3 |  |  |  | C |
| EX. 4 |  |  | 230 | A |
| COM. 4 |  |  |  | C |

In Experiments 1 to 6 of Example 1, Experiments 1 to 5 of Example 2, and Experiments 1 to 4 of Example 3, the film 12 did not slip with respect to the drive rollers. Note that, with reference to the results in Experiments 4 to 6 and Comparative Experiments 4 to 6 in Example 1, it is confirmed that, according to the present invention, it was possible to convey the film favorably without any problems even in the film temperature range in which it was impossible to convey the film by using the suction rollers without causing scratches, wrinkles, and roller marks on the film. In addition, roller marks due to the corrugation valleys and corrugation peaks did not remain on the film. Moreover, the film 12 did not have any scratches or wrinkles, and scratches due to the foreign matters adhered to the drive roller were not on the film 12. In Comparative Experiments of Examples 1 to 3, on the other hand, the slipping of the film with respect to the roller occurred more frequently, as the temperature, the tension applied to the film in its conveyed direction, and the conveying speed of the film respectively rose. As a result, scratches and wrinkles occurred on the film.

Various changes and modifications are possible in the present invention and may be understood to be within the present invention.

What is claimed is:
1. A film production method comprising the steps of:
melting and extruding a polymer, or casting and drying a polymer solution; and
conveying with use of a drive roller a polymer film formed by the extruding or the casting, said drive roller including a corrugation profile in which corrugation valleys and corrugation peaks each having a substantially semi-circular cross section are alternately formed on a peripheral surface along a circumferential direction of said drive roller, each of a pitch between said corrugation valleys and a pitch between said corrugation peaks being in the range of 0.01 to 2 mm, and a height from a lowest point of said corrugation valley to a highest point of said corrugation peak being in the range of 0.01 to 1 mm;

wherein a curvature radius of said corrugation valley and a curvature radius of said corrugation peak are in the range of 0.1 to 0.5 mm;

wherein a flat surface parallel to an axial direction of said drive roller is formed at each of said highest points of said corrugation peaks;

wherein said flat surface has a width in the range of 0.05 to 0.5 mm in said axial direction, wherein said polymer film having a temperature in the range of 100° C. to 200° C. is conveyed by said drive roller, and wherein a difference in tension between an upstream side and a downstream side with respect to said drive roller in a conveying direction of said polymer film is in the range of 5 to 200 N/m, the value of said difference in tension being obtained per meter in a width direction of said polymer film.

2. A film production method as defined in claim 1, wherein said polymer film is conveyed by said drive roller at a conveying speed in the range of 10 to 230 m/min.

3. A film production method as defined in claim 1, wherein marks of said corrugation valleys or said corrugation peaks do not remain on said polymer film when the pitch between said corrugation valleys and the pitch between said corrugation peaks is in the range of 0.01 mm to 2 mm.

* * * * *